L. C. GERMAIN.
POCKET LICENSE CARRIER.
APPLICATION FILED APR. 12, 1915.
1,210,927.
Patented Jan. 2, 1917.
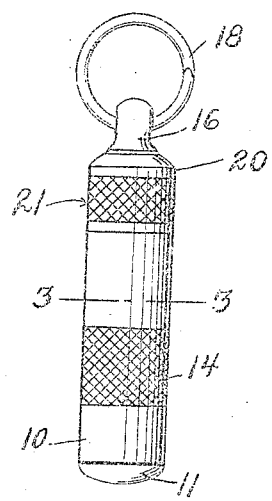
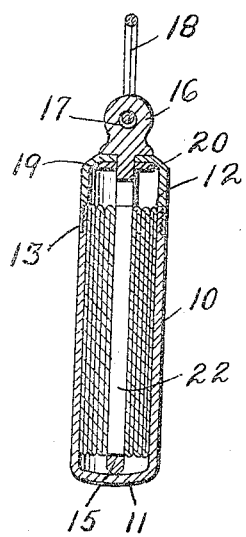
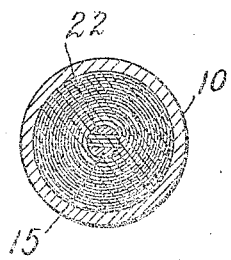
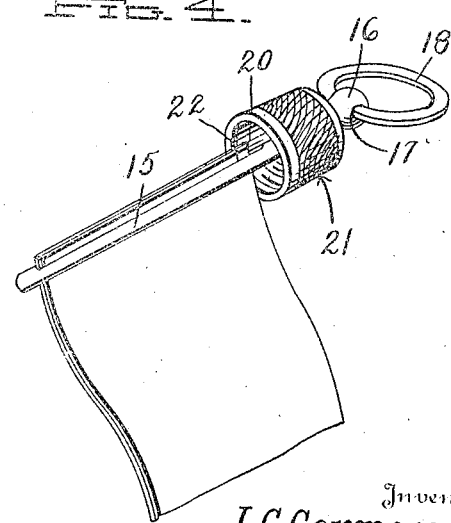
Inventor
L.C. Germain
Witnesses

UNITED STATES PATENT OFFICE.

LEON C. GERMAIN, OF CONWAY, MASSACHUSETTS.

POCKET LICENSE-CARRIER.

1,210,927.

Specification of Letters Patent.  Patented Jan. 2, 1917.

Application filed April 12, 1915. Serial No. 20,914.

*To all whom it may concern:*

Be it known that I, LEON C. GERMAIN, a citizen of the United States, residing at Conway, in the county of Franklin, State of Massachusetts, have invented certain new and useful Improvements in Pocket License-Carriers; and I do hereby declare the following to be a full, clear, and exact description of the invention, such as will enable others skilled in the art to which it appertains to make and use the same.

This invention relates to article carriers and more particularly to a device adapted to receive and protectively house an automobile driver's license or the like.

An object of the invention resides in the provision of a device of the above character, designed for detachable engagement with a key ring or similar means, so that it may be conveniently carried in the pocket and displayed when necessary to the proper authorities.

With the above and other objects of similar nature in view, the invention consists in the construction, combination and arrangement of parts, set forth in and falling within the scope of the appended claim.

In the drawing:—Figure 1 is an elevational view of the carrier attached to a key ring. Fig. 2 is a longitudinal sectional view therethrough with a license in position. Fig. 3 is a transverse sectional view taken on the line 3—3 of Fig. 1, and Fig. 4 is a perspective view of the carrier with the license withdrawn for inspection.

Referring now more particularly to the drawing, the carrier comprises a hollow cylindrical casing 10, provided with a closed end 11 and an open end 12, the latter end being exteriorly threaded as at 13, while the intermediate portion of the casing is knurled as at 14 whereby to afford a suitable grip for the fingers.

Insertible within the open end of the casing is a spindle 15 provided at its outer end with a head 16, said head being formed with a transverse opening 17 and constituting an attaching eye through which a key ring 18 or other similar means may be detachably engaged. Fixed upon the spindle 15 in spaced relation to the head is a collar 19, and swively mounted between said head and collar is an interiorly threaded cap 20, the outer surface of which is knurled as at 21. In attaching an automobile driver's license or like paper to the spindle 15 so that it may be inserted therewith and protectively housed in the casing 10, there is provided in the spindle a longitudinally extending slot 22, the license being folded and engaged with one end in said slot while the remaining portion is rolled upon the spindle by grasping and turning the head 16. The license is then inserted with the spindle within the casing 10 in a manner that is obvious, the cap 20 being engaged and tightened upon the latter and the parts thus quickly assembled.

It will be noted that by swiveling the cap 20 upon the spindle 15, the casing 10 is permitted to rotate freely about the latter so that accidental disengagement of the parts and possible loss or mutilation of the license is effectively prevented.

What is claimed, is:—

An article of the class described comprising a casing, one end of which is open, a license receiving spindle removably inserted within the casing and terminating at one end in an attaching eye, and a cap swivelly mounted on the spindle and detachably engaging the open end of the casing.

In testimony whereof, I affix my signature, in the presence of two witnesses.

LEON C. GERMAIN.

Witnesses:
  EDWIN T. COOK,
  ARTHUR C. GUILFORD.